(12) United States Patent
Naslund et al.

(10) Patent No.: US 11,480,980 B2
(45) Date of Patent: Oct. 25, 2022

(54) AIRCRAFT ANTI-SPIN SYSTEMS

(71) Applicant: Rosemount Aerospace Inc., Burnsville, MN (US)

(72) Inventors: Brian Brent Naslund, Chanhassen, MN (US); John D. Winter, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 191 days.

(21) Appl. No.: 16/135,271

(22) Filed: Sep. 19, 2018

(65) Prior Publication Data
US 2020/0089258 A1    Mar. 19, 2020

(51) Int. Cl.
| | |
|---|---|
| *G05D 1/08* | (2006.01) |
| *B64C 13/10* | (2006.01) |
| *B64D 43/02* | (2006.01) |
| *G05D 1/00* | (2006.01) |

(52) U.S. Cl.
CPC .......... *G05D 1/0816* (2013.01); *B64C 13/10* (2013.01); *B64D 43/02* (2013.01); *G05D 1/0088* (2013.01)

(58) Field of Classification Search
CPC .... G05D 1/0816; G05D 1/0088; G05D 1/106; G05D 1/0055; G05D 1/08; B64C 13/10; B64D 43/02
See application file for complete search history.

(56) References Cited

U.S. PATENT DOCUMENTS

| | | | |
|---|---|---|---|
| 5,803,408 A * | 9/1998 | Gast .................. | G05D 1/0607 701/14 |
| 6,169,496 B1 * | 1/2001 | Martin ................. | G05D 1/0072 340/963 |
| 6,273,370 B1 | 8/2001 | Colgren | |
| 8,200,379 B2 | 6/2012 | Manfredi et al. | |
| 8,214,089 B2 | 7/2012 | Caldeira et al. | |
| 8,620,495 B2 | 12/2013 | Alwin et al. | |

(Continued)

FOREIGN PATENT DOCUMENTS

WO    2015/065551    5/2015

OTHER PUBLICATIONS

Extended European search report issued in corresponding EP application No. 19198108.3, dated Feb. 7, 2020.

(Continued)

*Primary Examiner* — Jess Whittington
*Assistant Examiner* — Brian E Yang
(74) *Attorney, Agent, or Firm* — Locke Lord LLP; Daniel J. Fiorello; Gabrielle Gelozin

(57) ABSTRACT

An anti-spin system for an aircraft can include an anti-spin module configured to execute a computer implemented method. The method can include receiving flight data from one or more aircraft flight data systems, determining if the aircraft is near stall or in a stall using the flight data, and determining if the aircraft is in uncoordinated flight while near stall or in a stall to determine if the aircraft is near spin or in a spin using the flight data. If the aircraft is determined to be near spin, the method includes at least one of sending an alert to a warning indicator in a cockpit to warn the pilot of a spin or near spin condition, or sending a signal to an automated control system for inputting automatic control to the aircraft to avoid a spin by coordinating the aircraft or avoiding a stall while uncoordinated.

13 Claims, 3 Drawing Sheets

(56) References Cited

U.S. PATENT DOCUMENTS

| | | |
|---|---|---|
| 9,193,473 B2 | 11/2015 | Barth et al. |
| 9,440,747 B1 * | 9/2016 | Welsh .................. G05D 1/0061 |
| 9,846,432 B2 * | 12/2017 | Lam ......................... B64C 9/20 |
| 2004/0215372 A1 | 10/2004 | Bateman et al. |
| 2014/0371957 A1 | 12/2014 | Riedinger et al. |
| 2015/0084792 A1 * | 3/2015 | Barth ....................... G01D 7/02 |
| | | 340/966 |
| 2018/0086478 A1 * | 3/2018 | Hinks .................... B64D 43/02 |

OTHER PUBLICATIONS

EP Office Action Issued in corresponding EP application No. 19198108.3, dated Sep. 20, 2021 (7 pages).

\* cited by examiner

US 11,480,980 B2

AIRCRAFT ANTI-SPIN SYSTEMS

BACKGROUND

1. Field

The present disclosure relates to aircraft systems, more specifically to aircraft spin systems.

2. Description of Related Art

Current aircraft envelope protection devices are focused on the detection, annunciation, and response to stall conditions. If an aircraft enters a stall during uncoordinated flight (flight with nonzero sideslip and nonzero lateral acceleration) the aircraft can enter a spin. In a spin the outward wing is generating lift while the inboard wing is stalled, leading to a potentially catastrophic condition. Modern aircraft do not typically contain spin detection or prevention devices. Spin prevention on most aircraft is accomplished through pilot training. Stall prevention equipment is considered a mature technology while spin prevention equipment is not typically used on modern aircraft.

Such conventional methods and systems have generally been considered satisfactory for their intended purpose. However, there is still a need in the art for aircraft anti-spin systems. The present disclosure provides a solution for this need.

SUMMARY

In accordance with at least one aspect of this disclosure, an anti-spin system for an aircraft can include an anti-spin module configured to execute a computer implemented method. The method can include receiving flight data from one or more aircraft flight data systems, determining if the aircraft is near stall or in a stall using the flight data, and determining if the aircraft is in uncoordinated flight while near stall or in a stall to determine if the aircraft is near spin or in a spin using the flight data.

If the aircraft is determined to be near spin, the method can include at least one of sending an alert to a warning indicator in a cockpit to warn the pilot of a spin or near spin condition, or sending a signal to an automated control system for inputting automatic control to the aircraft to avoid a spin by coordinating the aircraft or avoiding a stall while uncoordinated. Inputting automatic control to the aircraft to avoid the spin can include inputting yaw control (e.g., rudder, asymmetric thrust) to coordinate the aircraft. Any other aircraft control is contemplated herein (e.g., pitch control, roll control, power control, etc.).

If the aircraft is determined to be in a spin, the computer implemented method can further include inputting automatic control to the aircraft to recover from the spin. Inputting automatic control to the aircraft to recover from the spin can include applying opposite yaw control to the direction of the spin. Any other aircraft control is contemplated herein (e.g., pitch control, roll control, power control, etc.).

Sending an alert to the warning indicator can include activating at least one of a stick shaker alert, a rudder shaker alert, or an audible or visual alert. Any other suitable alert is contemplated herein.

The method can include determining whether a pilot inputs a stall-avoidance control input to avoid a spin within a threshold period of time before inputting automatic control to the aircraft. The method can include overriding the pilot input and inputting automatic control to the aircraft regardless of the threshold period of time if the pilot inputs a stall-exacerbating input within the threshold period of time.

In certain embodiments, the system can include an air data probe. In certain embodiments, the anti-spin module can be at least partially included in an air data probe which also includes at least one flight data system and is operatively connected to an aircraft computer that is configured to control the aircraft.

In certain embodiments the system can include an aircraft computer and an automated control system system (e.g., integrated with the air data computer or a separate module). The anti-spin module can be at least partially included in the aircraft computer operatively connected to the one or more aircraft flight data systems, where the aircraft computer includes or is operatively connected to the autopilot.

In accordance with at least one aspect of this disclosure, a method can include any suitable portions and/or all of a method in accordance with this disclosure. In accordance with at least one aspect of this disclosure, a non-transitory computer readable medium can include computer executable instructions to cause a computer to perform any suitable method and/or portion(s) thereof disclosed herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
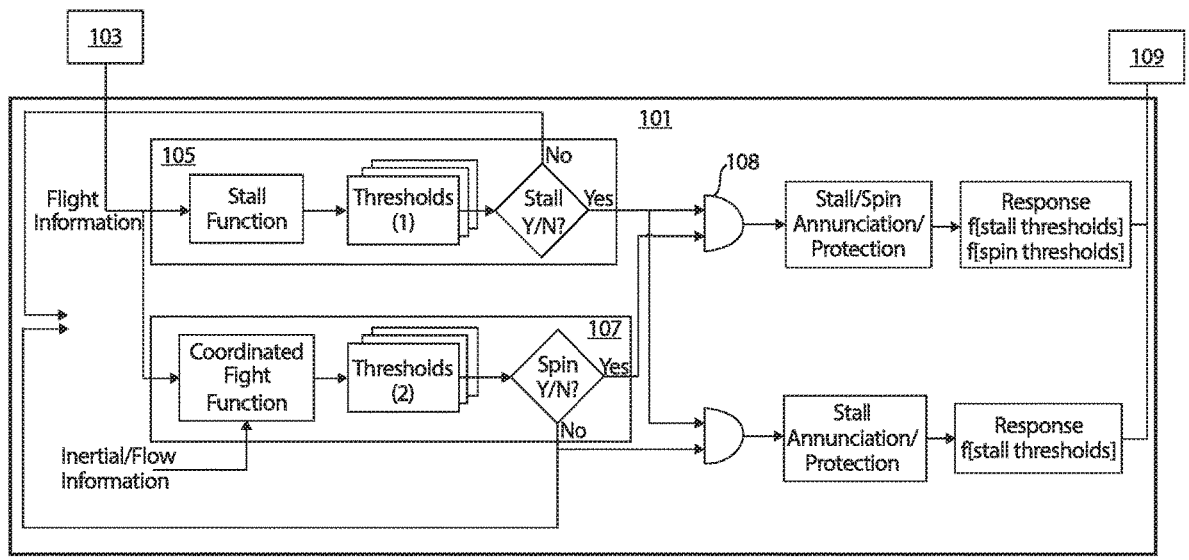
FIG. 1 is a schematic view of a system in accordance with this disclosure, showing a module in accordance with this disclosure connected to at least one flight data system and an automated control system.
Figure 2:
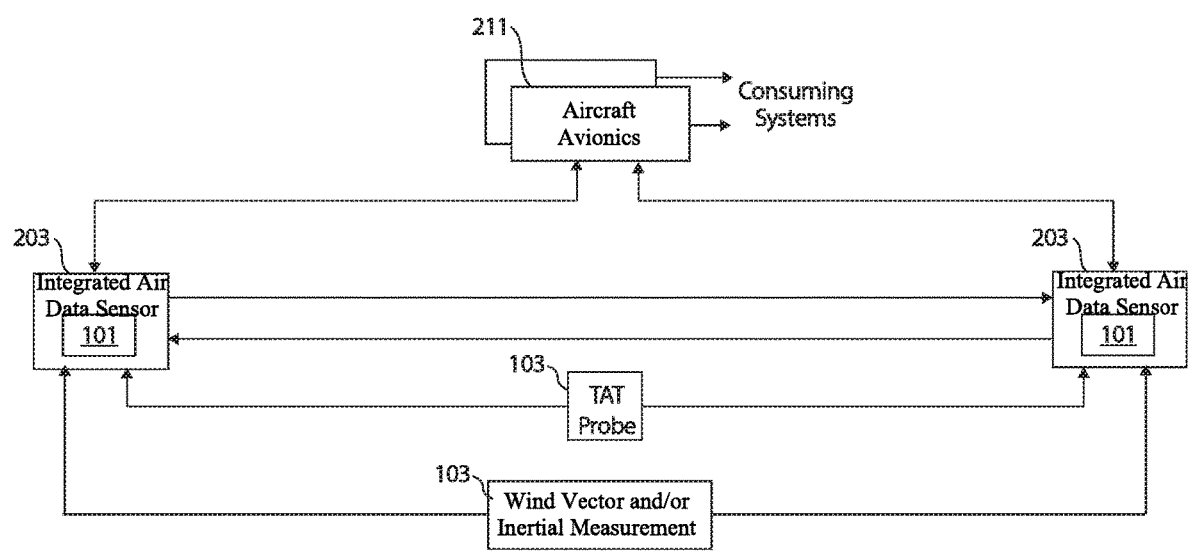
FIG. 2 is a schematic view of a system in accordance with this disclosure showing the module of FIG. 1 integrated at least partially into an air data probe in accordance with this disclosure.
Figure 3:
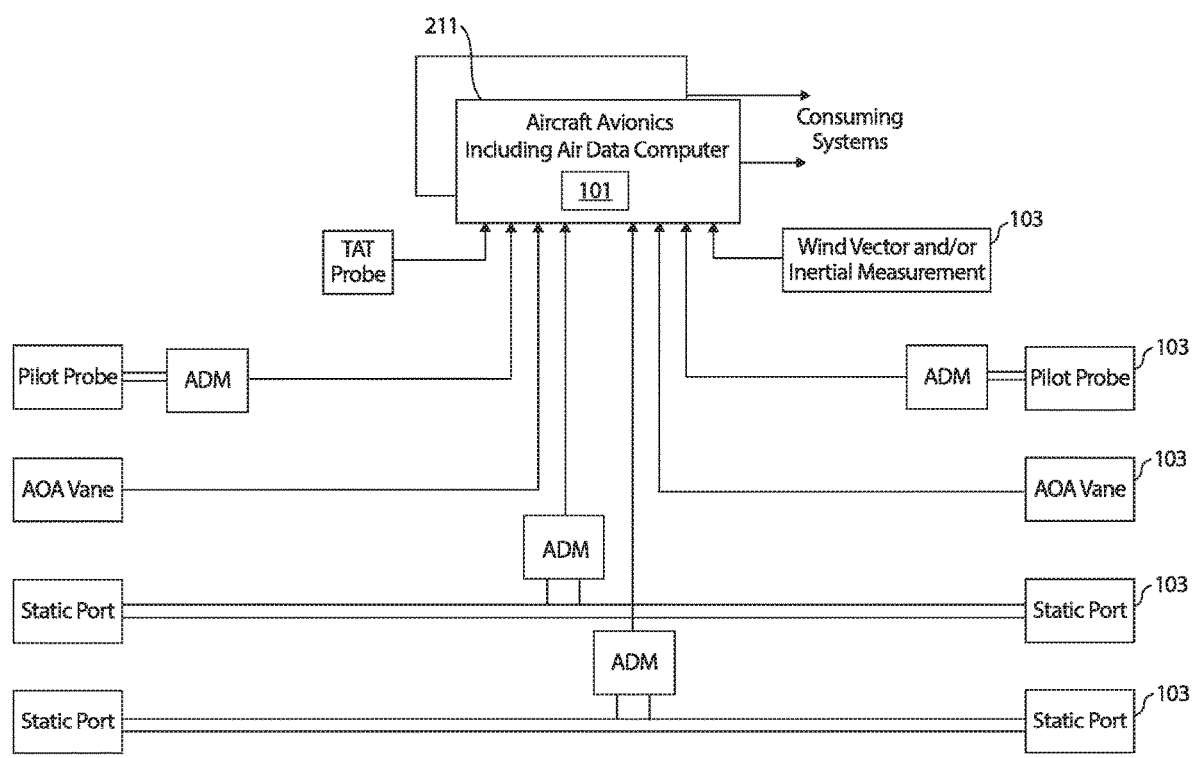
FIG. 3 is a schematic view of a system in accordance with this disclosure showing the module of FIG. 1 integrated at least partially into an aircraft computer in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. The systems and methods described herein can be used to provide anti-spin systems for aircraft, for example.

Referring to FIG. 1, an anti-spin system 100 for an aircraft can include an anti-spin module 101 configured to execute a computer implemented method (e.g., logic as shown in FIG. 1). The method can include receiving flight data from one or more aircraft flight data systems 103 and determining if the aircraft is near stall or in a stall using the flight data (e.g., at stall module 105).

The method can include determining if the aircraft is in uncoordinated flight (e.g., in slip module 107) using the flight data while near stall or in a stall to determine if the aircraft is near spin or in a spin. If the aircraft is determined to be near spin, the method can include at least one of sending an alert to a warning indicator in a cockpit to warn the pilot of a spin or near spin condition, or sending a signal to an automated control system 109 for inputting automatic control to the aircraft to avoid a spin by coordinating the aircraft or avoiding a stall while uncoordinated.

The automated control system 109 can include any suitable hardware and/or software for receiving the signal (analog and/or digital) and for inputting one or more directional and/or thrust controls to the aircraft. For example, the automated control system 109 can include a full authority autopilot as appreciated by those having ordinary skill in the art. In certain embodiments, the automated control system 109 can include one or more actuators connected to one or more flight controls (e.g., a stick pusher, a rudder pusher) that can be separate from, or a part of a full authority autopilot that can be controlled independently thereof.

In certain embodiments, data input to the slip module 107 and received thereby can include a combination of inertial and sideslip data from the one or more aircraft flight data systems 103. In certain embodiments, data input to the slip module 107 can include a three-dimensional wind vector from a laser based air data system or other measurement technology.

The data input to the slip module 107 can be used to determine turn coordination which can be used as an input to the spin detection and protection algorithms of the anti-spin module 101. The detection of a spin can be accomplished by the anti-spin module via comparison against characterized thresholds (e.g., utilized by stall module 105 and slip module 107) for proximity to stall (e.g., a threshold of within about 10 knots or within about 5 degrees of angle of attack) and severity of incoordination (e.g., a threshold of within about 5 degrees yaw away from coordination, or a threshold of about 80% margin to full slip). Any suitable thresholds (e.g., any slip at all) are contemplated herein. If the stall determination is within the threshold, the stall module 105 can output a yes to a comparison block 108. If the slip is within the threshold, the slip module 107 can output a yes to the comparison block 108.

If the comparison block 108 receives a yes from both the stall module 105 and the slip module 107, a near spin or spin condition can be determined and the module 101 can output an alert and/or output a control command to the automated control system 109 as disclosed herein. The response and magnitude can be calculated via a characterized function utilizing the detected state and rate of stall and spin. Spin protection can thus be accomplished by actuating flight control surface movements as determined by the response algorithm.

Inputting automatic control to the aircraft to avoid the spin can include inputting yaw control (e.g., rudder, asymmetric thrust) to coordinate the aircraft. Any other aircraft control is contemplated herein (e.g., pitch control, roll control, power control, etc.).

If the aircraft is determined to be in a spin, the computer implemented method can further include inputting automatic control (e.g., by sending a signal to the autopilot 109) to the aircraft to recover from the spin. Inputting automatic control to the aircraft to recover from the spin can include applying opposite yaw control to the direction of the spin. Any other aircraft control is contemplated herein (e.g., pitch control, roll control, power control, etc.).

Sending an alert to the warning indicator can include activating at least one of a stick shaker alert, a rudder shaker alert, or an audible or visual alert. Any other suitable alert is contemplated herein.

The method can include determining whether a pilot inputs a stall-avoidance control input to avoid a spin within a threshold period of time before inputting automatic control to the aircraft. The method can include overriding the pilot input and inputting automatic control to the aircraft regardless of the threshold period of time if the pilot inputs a stall-exacerbating input within the threshold period of time.

Referring to FIG. 2, in certain embodiments, the system 100 can include an air data probe 203. In certain embodiments, the anti-spin module can be at least partially included in an air data probe 203 (which also includes at least one flight data system 103) and is operatively connected to an aircraft computer 211 that is configured to control the aircraft (e.g., by including or being connected to an automated control system 109).

Referring additionally to FIG. 3, in certain embodiments the system 100 can include an aircraft computer 211 and an automated control system 109 (e.g., integrated with the air data computer or a separate module). As shown, the anti-spin module 101 can be at least partially included in the aircraft computer 211 operatively connected to the one or more aircraft flight data systems 103. In certain embodiments, the aircraft computer 211 can include or be operatively connected to the automated control system 109.

The modules 101, 105, 107, for example, can include any suitable computer hardware and/or software to perform the disclosed functions, e.g., as appreciated by those having ordinary skill in the art. Also, it is contemplated that modules 101, 105, 107 can be hosted in the same location and/or in one or more other suitable locations apart from each other. Each module 101, 105, 107 can also be a single module or a conglomeration of modules located in the same or one or more different places.

In accordance with at least one aspect of this disclosure, a method can include any suitable portions and/or all of a method in accordance with this disclosure. In accordance with at least one aspect of this disclosure, a non-transitory computer readable medium can include computer executable instructions to cause a computer to perform any suitable method and/or portion(s) thereof disclosed herein.

Embodiments include a computerized device that consumes flight data inputs to determine whether an aircraft is entering the stall and spin flight regime. These flight data inputs can include air data parameters, such as angle of attack, airspeed, and altitude, as well as either inertial inputs or the relative wind vector. Additional inputs can include be the aircraft configuration information such as high lift devices and landing gear position. These input parameters can be used by one or more modules disclosed herein to determine whether the flight condition represents a stall or a stall with a spin probability based on uncoordinated flight.

If the conditions are detected for stall, embodiments can indicate the condition, e.g., in a similar manner to current state of the art stall computers. If spin conditions are detected, embodiments can trigger, e.g., a unique indicator to inform the flight crew of the imminent spin. In certain embodiments, if the flight condition worsens to a probable spin entry embodiment can trigger a secondary protection output which can activate the appropriate flight controls (e.g., trigger rudder pedal activation to compensate with rudder movement).

Embodiments can use an angle of attack sensor and related data to determine where critical angle of attack for stall is based on aircraft configuration (flaps, gear, etc.). Embodiments can also use a slip/wind angle sensor and/or an inertial sensor to determine that there is slip or that slip exceeds a threshold and then determine that the aircraft is uncoordinated.

Traditional stall computers only offer annunciation for traditional stall conditions. Embodiments improve safety by adding a spin detection function and can provide spin protection outputs which can alert the flight crew of an impending spin and, if necessary, can activate the appropriate flight control surfaces to mitigate spin entry or engage spin recovery. In embodiments utilizing a three-dimensional wind vector, improved characterization of the aircraft stall and spin tendencies can be accurately mapped which can provides enhanced safety through protection over a broader region of the flight envelope.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A anti-spin system for an aircraft, comprising:
an anti-spin module configured to execute a computer implemented method, the method comprising:
receiving flight data from one or more aircraft flight data systems;
determining if the aircraft is approaching stall or in a stall using the flight data;
determining if the aircraft is in uncoordinated flight while approaching stall or in a stall to determine if the aircraft is approaching spin or in a spin using the flight data;
if the aircraft is determined to be approaching spin, at least one of:
sending an alert to a warning indicator in a cockpit to warn the pilot of a spin or approaching spin condition; or
sending a signal to an automated control system for inputting automatic control to the aircraft to avoid a spin by coordinating the aircraft or avoiding a stall while uncoordinated;
determining whether a pilot inputs a stall-avoidance control input to avoid a spin within a threshold period of time before inputting automatic control to the aircraft; and
overriding the pilot input and inputting automatic control to the aircraft regardless of whether the threshold period of time is met in response to the pilot inputting a stall-exacerbating input within the threshold period of time, wherein inputting automatic control to the aircraft to avoid the spin includes inputting yaw control to coordinate the aircraft.

2. The system of claim 1, wherein if the aircraft is determined to be in a spin, the computer implemented method further comprises inputting automatic control to the aircraft to recover from the spin.

3. The system of claim 2, wherein inputting automatic control to the aircraft to recover from the spin includes applying opposite yaw control to the direction of the spin.

4. The system of claim 1, wherein sending an alert to the warning indicator includes activating at least one of a stick shaker alert, a rudder shaker alert, or an audible or visual alert.

5. The system of claim 1, wherein the anti-spin module is at least partially included in an integrated air data probe which also includes at least one flight data system and is operatively connected to an aircraft computer that is configured to control the aircraft.

6. The system of claim 1, wherein the anti-spin module is at least partially included in the aircraft computer operatively connected to the one or more aircraft flight data systems, wherein the aircraft computer includes or is operatively connected to the autopilot.

7. A non-transitory computer readable medium, comprising computer executable instructions to cause a computer to perform a method, the method comprising:
receiving flight data from one or more aircraft flight data systems;
determining if the aircraft is approaching stall or in a stall using the flight data;
determining if the aircraft is in uncoordinated flight while approaching stall or in a stall to determine if the aircraft is approaching spin or in a spin using the flight data;
if the aircraft is determined to be approaching spin, at least one of:
sending an alert to a warning indicator in a cockpit to warn the pilot of a spin or approaching spin condition; or
sending a signal to an automated control system for inputting automatic control to the aircraft to avoid a spin by coordinating the aircraft or avoiding a stall while uncoordinated;
determining whether a pilot inputs a stall-avoidance control input to avoid a spin within a threshold period of time before inputting automatic control to the aircraft; and
overriding the pilot input and inputting automatic control to the aircraft regardless of whether the threshold period of time is met in response to the pilot inputting a stall-exacerbating input within the threshold period of time, wherein inputting automatic control to the aircraft to avoid the spin includes inputting yaw control to coordinate the aircraft.

8. The non-transitory computer readable medium of claim 7, further comprising, wherein if the aircraft is determined to be in a spin, inputting automatic control to the aircraft to recover from the spin.

9. The non-transitory computer readable medium of claim 8, wherein inputting automatic control to the aircraft to recover from the spin includes applying opposite yaw control to the direction of the spin.

10. The non-transitory computer readable medium of claim 7, wherein sending an alert to the warning indicator includes activating at least one of a stick shaker alert, a rudder shaker alert, or an audible or visual alert.

11. A method, comprising:
receiving flight data from one or more aircraft flight data systems;
determining if the aircraft is approaching stall or in a stall using the flight data;
determining if the aircraft is in uncoordinated flight while approaching stall or in a stall to determine if the aircraft is approaching spin or in a spin using the flight data;
if the aircraft is determined to be approaching spin, at least one of:
sending an alert to a warning indicator in a cockpit to warn the pilot of a spin or approaching spin condition; or
sending a signal to an automated control system for inputting automatic control to the aircraft to avoid a spin by coordinating the aircraft or avoiding a stall while uncoordinated;
determining whether a pilot inputs a stall-avoidance control input to avoid a spin within a threshold period of time before inputting automatic control to the aircraft; and
overriding the pilot input and inputting automatic control to the aircraft regardless of whether the threshold period of time is met in response to the pilot inputting a stall-exacerbating input within the threshold period of time, wherein inputting automatic control to the aircraft to avoid the spin includes inputting yaw control to coordinate the aircraft.

12. The method of claim 11, further comprising, wherein if the aircraft is determined to be in a spin, inputting automatic control to the aircraft to recover from the spin.

13. The method of claim 12, wherein inputting automatic control to the aircraft to recover from the spin includes applying opposite yaw control to the direction of the spin.

* * * * *